United States Patent

[11] 3,631,773

[72] Inventor  Donald E. Moodie
               Nashua, N.H.
[21] Appl. No. 864,630
[22] Filed     Oct. 8, 1969
[45] Patented  Jan. 4, 1972
[73] Assignee  Polaroid Corporation
               Cambridge, Mass.

[54] UNIQUE IDENTIFICATION CARD CAMERA SYSTEM WITH LIGHT SEALED DATA CARD INSERTION ARRANGEMENT
     12 Claims, 8 Drawing Figs.

[52] U.S. Cl. .................................................. 95/1.1
[51] Int. Cl. ............................................ G03b 17/24
[50] Field of Search ................................... 95/1.1

[56]            References Cited
               UNITED STATES PATENTS
2,362,814  11/1944  Gorey .......................... 95/1.1
2,420,046   5/1947  Loeb ........................... 95/1.1 X
2,896,522   7/1959  Stein .......................... 95/1.1
3,263,582   8/1966  Gatley ......................... 95/1.1
3,488,753   1/1970  Tone ........................... 95/1.1 X Primary Examiner—John M. Horan
Attorneys—Brown and Mikluka, William D. Roberson and Robert L. Berger ABSTRACT: A camera system which employs a lens-shutter element to form an image of a subject positioned exteriorly of such system on a sheet of photographic material, a lens element for forming an image of a data card insertable into such system on the same sheet of photographic material and an arrangement for limiting light rays intersecting a first selected section of such photographic material to those from the subject and for limiting light rays intersecting a second selected section of such material to those from the data card. A data card container is removably insertable into the camera system and includes a portion extending exteriorly of the camera's housing having an elongated opening to facilitate the removable insertion of the data card into the camera. This container seats in a spring clip within the camera system and includes a light-sealing chamber adjacent its elongated opening.

PATENTED JAN 4 1972
3,631,773
SHEET 1 OF 4
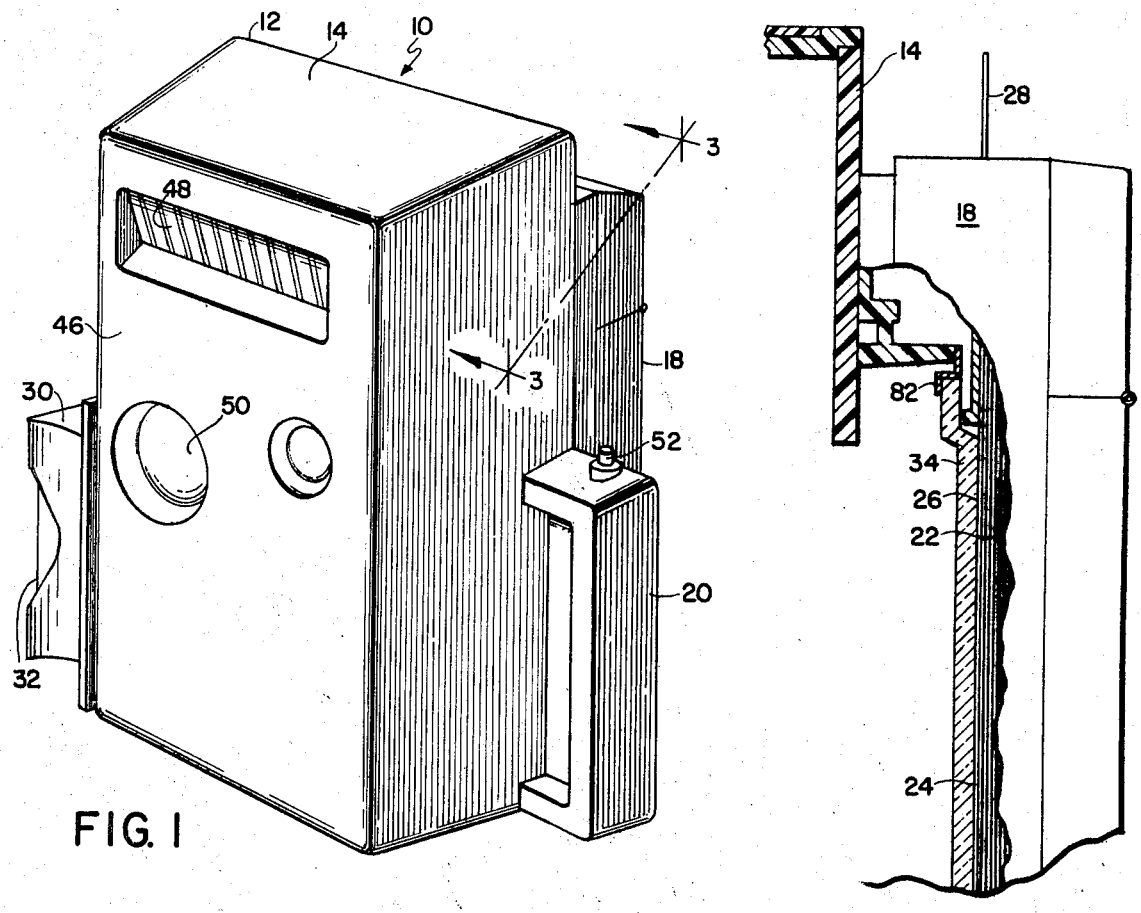
FIG. 1
FIG. 3
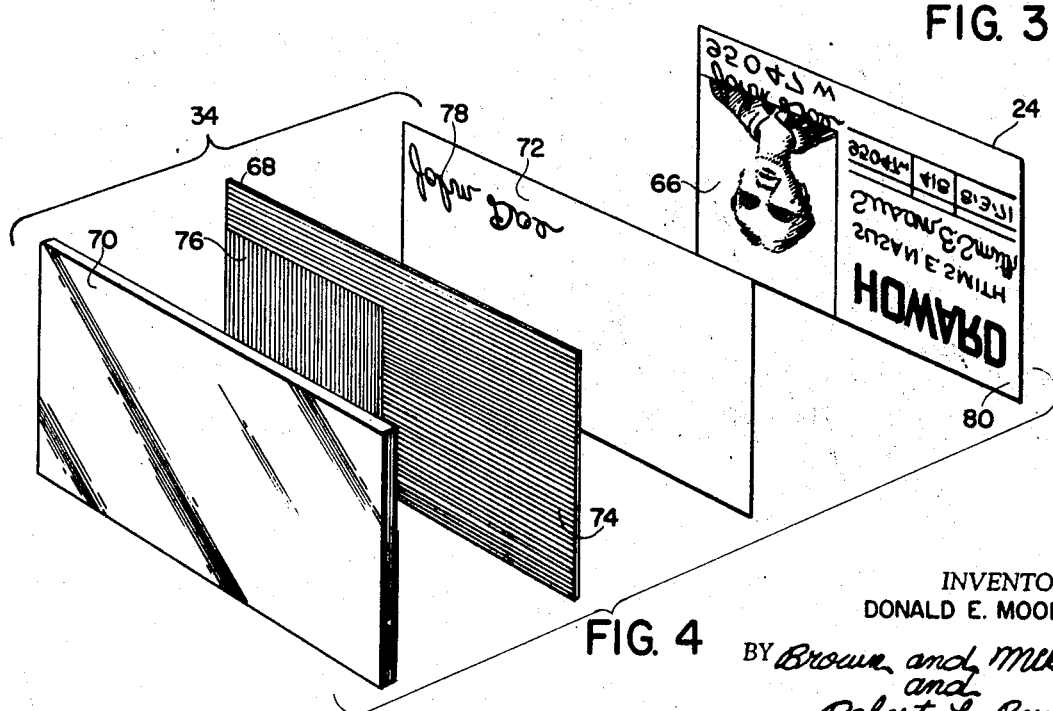
FIG. 4
INVENTOR.
DONALD E. MOODIE
BY Brown and Mikulka
and
Robert L. Berger
ATTORNEYS INVENTOR.
DONALD E. MOODIE
BY Brown and Mikulka
and
Robert L. Berger
ATTORNEYS

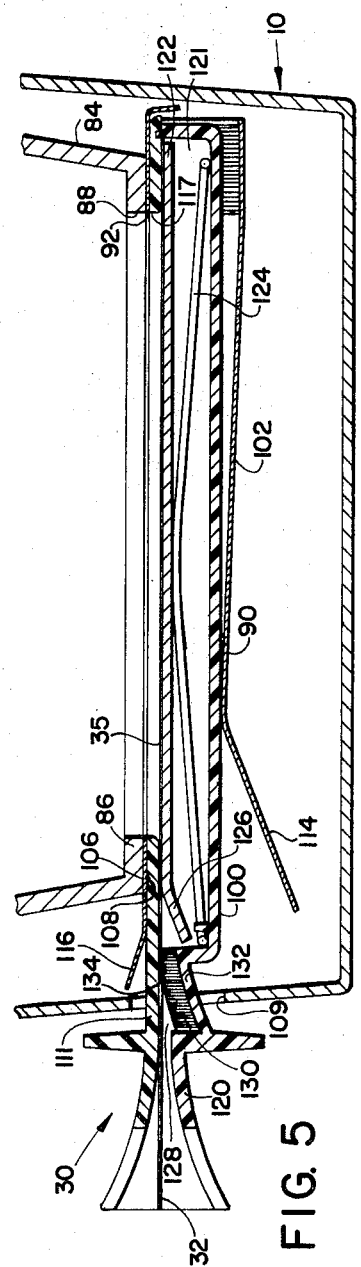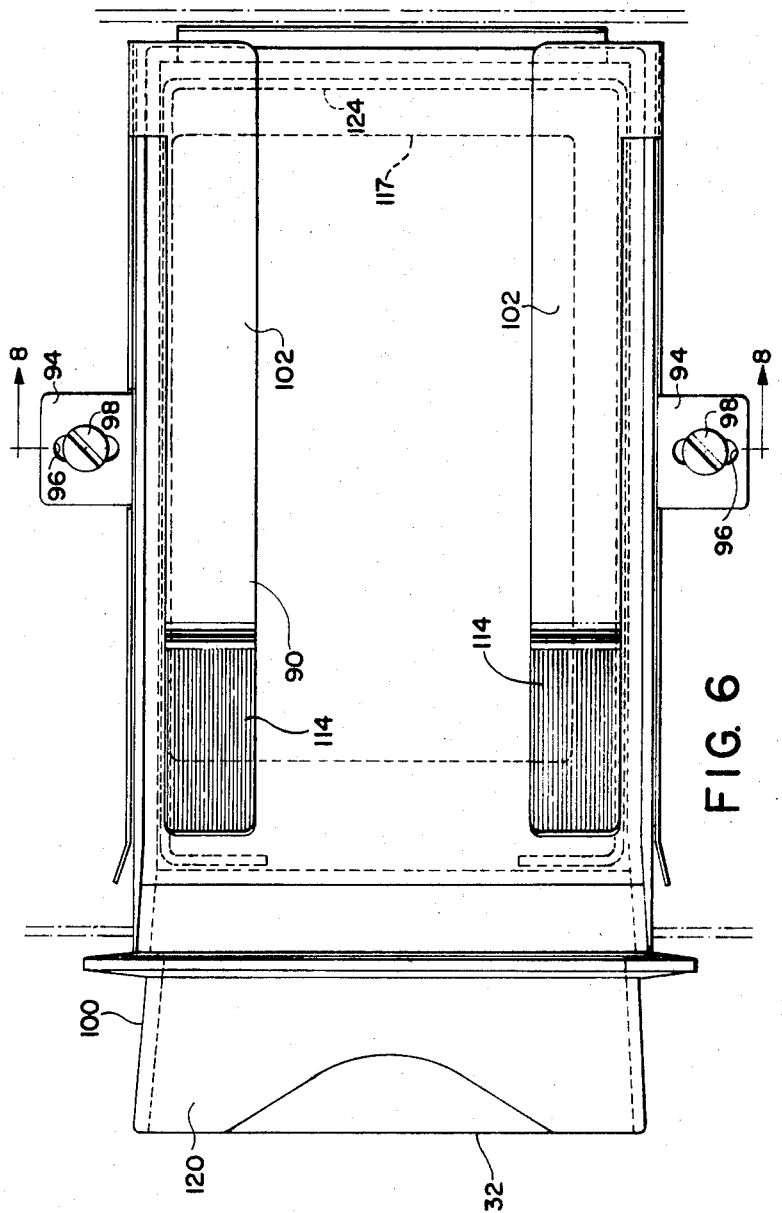

INVENTOR.
DONALD E. MOODIE

UNIQUE IDENTIFICATION CARD CAMERA SYSTEM WITH LIGHT SEALED DATA CARD INSERTION ARRANGEMENT

BACKGROUND OF THE INVENTION

1. Field of Invention

This invention relates to photography and, more particularly, to an improved camera system for producing identification cards.

2. Description of the Prior Art

Frequently it is necessary to present different types of information on a single format. One common requirement of this nature is an identification card which includes both a photograph of the subject and certain printed data concerning the subject and issuing agency. Until recent years, identification cards of this type had generally been produced by first taking a photograph of the subject and later cutting and pasting that photograph onto a card containing the pertinent information in printed form. This type of operation normally resulted in the subject's receiving his identification card a number of weeks after being photographed. Another disadvantage associated with these earlier identification card producing techniques was the continuous hazard that the issuing agency might put a photograph on the wrong card causing considerable confusion in the agency's records. Additionally, if the photograph proved unsatisfactory when returned in fully processed form, it was necessary to recall the subject in order to procure a satisfactory photograph.

Systems are now available which facilitate the simultaneous photographic reproduction of images of the subject and the desired information on a single sheet of photographic material. One such system is presently marketed by Polaroid Corporation of Cambridge, Mass. which produces the recorded images on a single photograph in full color in 60 seconds. In another 60 seconds, the card produced by that camera system can be laminated with an overlay of transparent plastic material and sealed in a protective transparent pouch. There is no need to recall the person at a later date for a retake because the card did not turn out perfectly. The subject leaves with a positive, permanent means of identification. A temporary card is not required, nor is there any delay waiting for the completed card to be delivered. Also, there is no expense in handling the card at a later date such as costs associated with obtaining records from files and card delivery or pickup.

No special skills are required to operate identification card systems of this type, which can be run by anyone who has the manual dexterity to manage a simple office machine. Such a system can provide as many as 200 sealed full color identification cards in a period of 1 hour.

These systems are presently enjoying extensive use in a number of states for purposes of producing driver's licenses. Additionally, they are being employed by numerous government agencies, colleges and private companies to provide tamperproof means of identification. Obviously, the use of such systems will increase as a function of reductions in their cost.

In systems of this type, a door arrangement is normally provided to facilitate the mounting of a data card at the proper position for purposes of photographing same. A lens and shutter element is mounted within the camera system for purposes of forming an image of that card on a sheet of photographic material. Another lens and shutter element is mounted in the camera system for purposes of forming an image of the subject on the same sheet of photographic material. The present invention is directed to an improved identification camera system employing a unique arrangement for receiving and mounting a data card and which eliminates the requirement for a shutter mechanism associated with the data card objective lens.

One of the objects of this invention, therefore, is to provide an improved identification card camera system.

Another primary object of this invention is to provide an improved camera system of the type indicated capable of having a data card inserted thereinto and withdrawn therefrom without disrupting the light-sealing nature of the system's housing.

A further object of this invention is to provide an identification card camera system having a removable data card container.

An additional object of this invention is to provide an improved camera system of the type indicated which, while employing two objective lens elements, requires only one shutter mechanism.

Also, an object of this invention is to provide an improved camera system of the type indicated which employs a shutterless data card optical system.

SUMMARY OF THE INVENTION

In its illustrated preferred embodiment, the camera system of this invention is adapted to photographically produce an identification card having a first section on which a photograph of the subject is presented and a second section on which certain information concerning the subject and the issuing agency is presented. This camera system includes a film holder adapted to mount a sheet of unexposed photographic material at a focal plane.

The camera's housing is provided with an elongated slot adapted to have a data card container inserted therethrough. When inserted through the aforementioned elongated slot, a portion of the container is removably received by a spring clip mounted from a section of the camera's frame structure. Means are provided to permit adjustments to be made in the orientation of the spring clip with respect to the camera's frame structure. Flanged sections of the spring clip serve to guide the container into the clip which is further configured to accurately position the container within the camera. When mounted in the spring clip, a portion of the container provided with an elongated opening adapted to receive a data card extends exteriorly of the camera's housing.

Adjacent the container's elongated opening is a light-sealing chamber through which the portion of the data card containing the information to be reproduced on the sheet of photographic material may be selectively inserted and withdrawn from the camera system. A spring-biased pressure platen is mounted within the container so as to accurately position the portion of the data card containing the information to be photographically reproduced within the camera system for purposes of photographing. This arrangement permits the data card to be inserted into and withdrawn from the camera system without disrupting the light-sealing nature of that system's housing and, further, permits the entire data card container to be removed therefrom in the event of a malfunction.

Mounted within the camera system in operable relationship to the data card is an electronic flash unit and an objective lens for forming an image of the data card on the sheet of photographic material. The camera is also provided with a second electronic flash unit and an objective lens-shutter element for forming an image of a subject seated externally of the camera system on the sheet of photographic material. An arrangement is included for preventing light rays from the subject intersecting that section of the sheet of the photographic material on which the data card information is intended to be recorded and light rays from the data card intersecting that section of the sheet of photographic material upon which the image of the subject is intended to be recorded.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

FIG. 1 is a diagrammatic perspective view of a camera system incorporating the features of the present invention;

FIG. 3 is a fragmentary sectional view of the camera system of FIG. 1 taken along line 3—3 of FIG. 1;

FIG. 4 is a diagrammatic exploded perspective view of the validation plate-forming part of the camera system of FIG. 1 and illustrating the operable relationship between that plate and a sheet of photographic material mounted in such system;

FIG. 5 is a fragmentary sectional view of the camera system of FIG. 1 illustrating the mounting arrangement for the data card container and certain details of that container;

FIG. 6 is a diagrammatic front elevation view of the data card container mounting arrangement within the camera system of FIG. 1;

DESCRIPTION OF A PREFERRED EMBODIMENT

Figure 2:
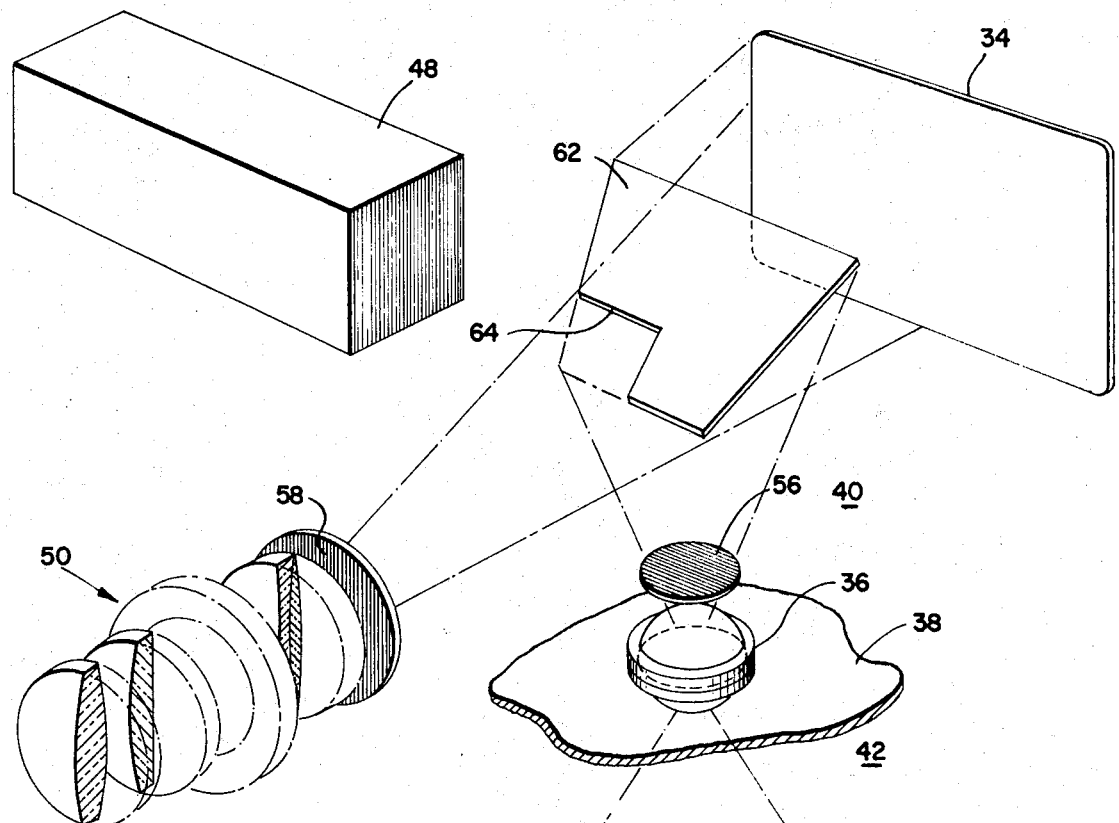
FIG. 2 is a diagrammatic perspective view of the optical system employed in the camera system of FIG. 1.
Figure 7:
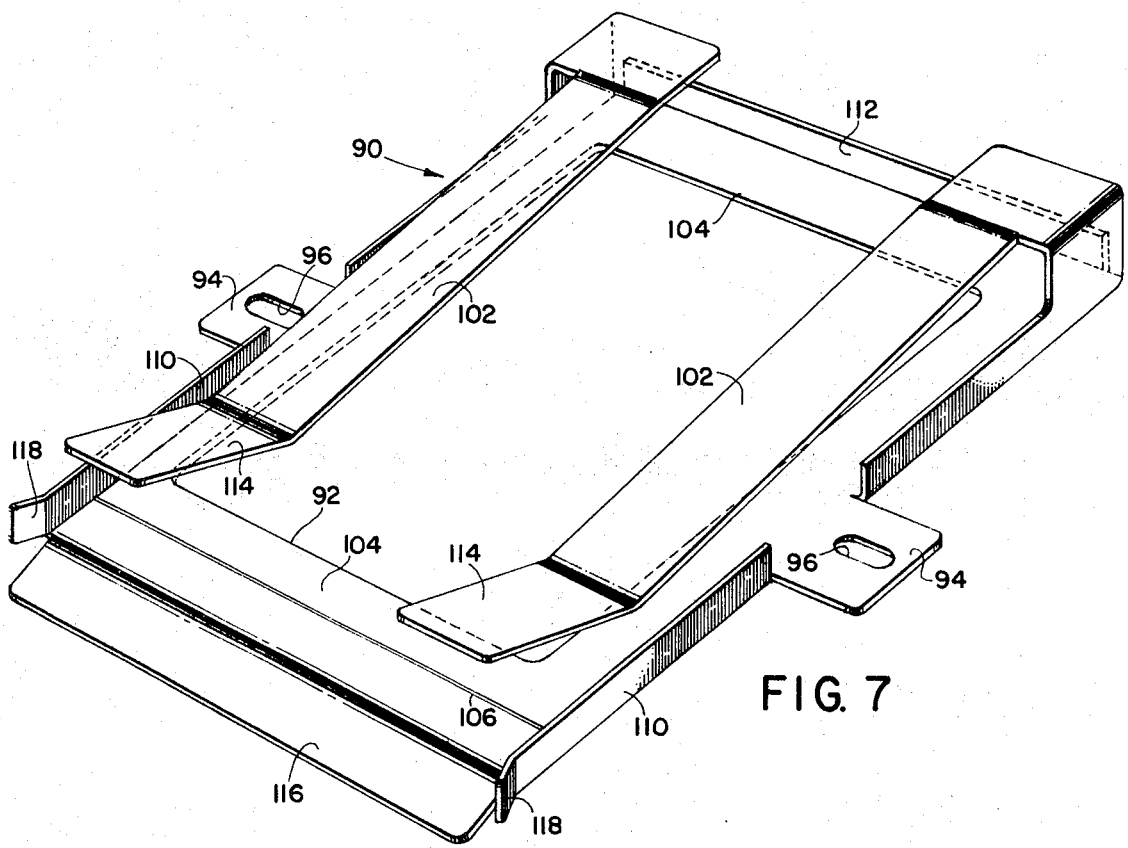
FIG. 7 is a diagrammatic perspective view of the spring clip adapted to receive the data card container.
Figure 8:
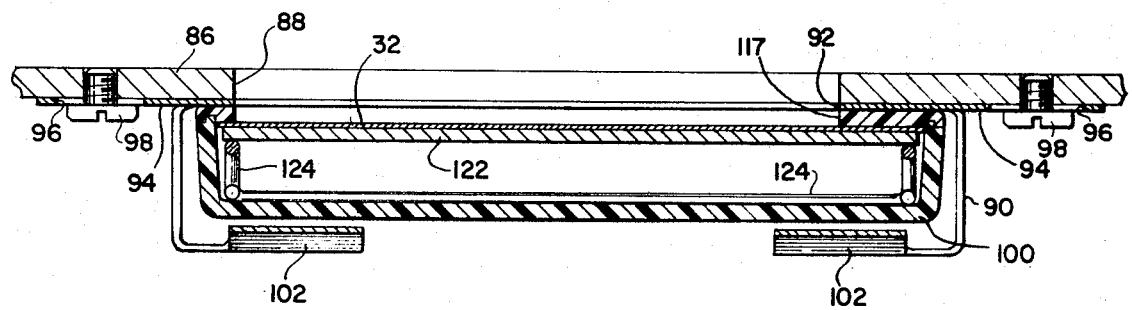
FIG. 8 is a sectional view of the mounting arrangement for the data card container taken along line 8—8 of FIG. 6.

The illustrated preferred embodiment of this invention may best be understood by first referring to FIG. 1 of the drawings which illustrates a camera system 10 capable of photographically producing identification cards depicting a photograph of the subject and certain information concerning the subject and the issuing agency.

This camera system 10 comprises an opaque housing or shroud 12 including a first section 14 in which the camera's optical system is contained and a film holder 18 removably connected thereto. Extending from one side of the camera's first section 14 is a handle 20 designed to be gripped by the operator for purposes of aiming and/or supporting the camera 10 during exposure operations. Preferably, the film holder 18 is adapted to receive a film pack 22 containing a plurality of film units (See FIG. 3), which may advantageously be of the diffusion-transfer processing type, and to sequentially position the negative emulsion bearing photographic sheet 24 of each film unit at a focal plane 26 within the camera 10. Also housed within the film holder 18 are means (not shown) for effecting the application of a processing fluid between the negative emulsion bearing photographic sheet 24 and an image-receiving sheet of each film unit after exposure and as the film unit is withdrawn from the holder by the operator's pulling a tab 28 connected thereto. The specific forms of the film holder 18 and the film units contained in the film pack 22 do not constitute part of the present invention and, for instance, may be identical to those of such items currently being marketed.

The first section 14 of the camera system 10 also includes a card receiving and mounting arrangement 30 which facilitates the insertion of a data card on which certain information is imprinted into the camera for purposes of photographing same. This arrangement 30 constitutes an important feature of the present invention and will be described in more detail hereinafter.

FIG. 2 diagrammatically illustrates the optical system housed within the section 14 of the camera 10 and the operable relationship between that optical system, a data card 32 and a polarizing plate 34, In this figure of the drawings, the data card 32 is shown as being positioned within the camera system 10 at the proper location for photographing. It will be noted that in this embodiment the information appearing on the data card 32 and intended to be photographically reproduced on the photographic sheet 24 is located on a generally "L-shaped" section 35 of the card. An objective lens element 36 associated with the data card 32 is mounted in an opaque internal wall member 38 of the camera system 10, which wall member effectively serves to divide that system into two separate chambers 40 and 42. Positioned within the camera system's chamber 42 is an electronic flash unit 44 which, when fired, serves to illuminate the data card 32.

Located in the front face 46 (See FIG. 1) of the camera system 10 is a second electronic flash unit 48 and an objective lens-shutter element 50 which facilitate the photographing of a subject positioned in front of the camera. In this connection, the flash unit 48 illuminates the subject and an image of that subject is formed by the objective lens of the element 50 on the sheet of photographic material 24. Conveniently mounted on the handle 20 is a button 52 (See FIG. 1) which may be selectively depressed by the operator to effect simultaneous photographing of the subject and data card 32. In this connection, a conventional arrangement may be employed to activate the shutter of the element 50 and to fire the flash units 44 and 48 whenever the button 52 is so depressed. The flash unit 48 is typically energized whenever the shutter 50 is activated.

Polarizing elements 56 and 58 are mounted adjacent the lens element 36 and the objective lens-shutter element 50, respectively, so as to intercept substantially all light rays passing through those two elements. Importantly, the transmission axes of these polarizing elements 56 and 58 are orthogonally aligned with respect to each other.

Upon firing of the flash unit 44, light rays from the illuminated data card 32 are reflected by a first mirror 60 through the objective lens element 36 and the polarizing element 56 onto a second mirror 62 and then redirected by that latter mirror onto the polarizing plate 34 overlying the photographic material 24. The objective lens element 36 serves to form an image of the data card 32 on the sheet of photographic material 24. Simultaneously the flash unit 48 illuminates the subject and an image of the subject if formed by the objective lens of the lens-shutter element 50 on the sheet of photographic material 24. In the illustrated preferred embodiment, the mirror 62 is provided with a cutout (or unsilvered portion) 64 so as not to preclude certain light rays from the subject intersecting a selected section 66 (See FIG. 4) of the sheet of photographic material 24 on which it is intended to produce an image of the subject.

As in the case of the film holder 18, the film units of the film pack 22 and the arrangements for activating the shutter 50 and flash units 44 and 48, the lens element 36 and the lens-shutter element 50 and the flash units do not by themselves constitute a part of the present invention. Consequently, these components of the system may take conventional or special forms other than as illustrated in the drawings within the scope of the present invention. Additionally, other arrangements of these elements within a camera system other than that illustrated and described in connection with the preferred embodiment of the present invention may be employed within the scope of this invention.

Referring now to FIG. 4 of the drawings, it will be seen that the polarizing plate 34 is constituted by a sheet of polarizing materials 68 mounted between a pair of light transparent supports 70 and 72. As indicated, this polarizing plate 34 overlies and is positioned in close proximity to the sheet of photographic material 24. Consequently the sheet of polarizing materials 68 may have approximately the same dimensions as the finished identification card. This sheet 68 comprises a first generally "L-shaped" section 74 having a transmission axis aligned with that of the polarizing element 56 and a rectangularly shaped section 76 having its transmission axis aligned with that of the polarizing element 58. Conventional means may be employed to fabricate the sheet of polarizing materials 68. For instance, this sheet 68 may comprise a lamination of polyvinyl alcohol sheets, each having been stretched and molecularly oriented so as to be birefringent, appropriately dyed and printed in accordance with current techniques to provide the aforementioned sections 74 and 76 having orthogonally aligned transmission axes. Alternately, other conventional forms of polarizing sheet material may be cut, aligned and mounted on a suitable transparent support.

The supports 70 and 72 may be formed with any suitable material such as an acrylic lucite or a glass and appropriately adhered to the opposite faces of the sheet 68. These supports 70 and 72 not only serve to support the sheet of polarizing materials 68 but also serve to protect that sheet from foreign matter, abrasion, etc. The support 72 may be provided with indicia 78, such as a validating signature, company name, trademark or other symbol, which it is intended to photographically reproduce on the sheet of photographic material 24. In this respect, such indicia may be hot stamped in an opaque ink into a surface of the support 72. Preferably, it would be stamped into the surface of that support 72 intended to be mounted adjacent to the sheet of photographic material 24 and at a position thereon wherein it would appear in part on the section 66 of that material and a section 80 thereof on which latter section the data card information is reproduced. The plate 34 is mounted adjacent to the sheet 24 so that the sections 74 and 76 of its polarized sheet 68 respectively overlie the sections 80 and 66 of the photographic sheet 24. To minimize any distortion of the images, it is desirable that the support 72 be relatively thin and that the polarizing plate 34 be mounted as close as possible to the sheet of photographic material 24.

It will thus be appreciated that the plate 34, in combination with the polarizing elements 56 and 58, serves to effectively limit the light rays intersecting section 66 of the sheet of photographic material 24 to those from the subject and to limit the light rays intersecting section 80 of the sheet of photographic material to those from the data card 32. This particularly advantageous system for effecting such a result is the subject of copending application Ser. No. 864,671 of Bruce K. Johnson filed on Oct. 8, 1969 and now abandoned in favor of application Ser. No. 49,960 filed on June 27, 1970, which latter application is a continuation-in-part of the former. It will be recognized by those skilled in the art that other systems, such as a septum arrangement, may be employed for effecting a similar result in connection with an alternate embodiment of the present invention.

In the illustrated embodiment, the film holder 18 is provided with mounting clips 82 to releasably position the polarizing plate 34 adjacent to the focal plane 26 before the film holder itself is mounted on the section 14 of the camera system 10.

The data card receiving and mounting arrangement 30 of the camera system 10 is depicted in detail in FIGS. 5 through 8 of the drawings. As best seen in FIG. 5, the camera's section 14 includes an internal frame structure 83, one side 86 of which is disposed in generally parallel alignment with respect to the camera's front face 46, such side being provided with an aperture 88. A spring clip 90 is mounted to the side 86 of the internal frame structure 84 and is provided with an aperture 92 of substantially the same size and configuration of the frame structure's aperture 88. In this connection, the spring clip 90 includes a pair of projections 94 (See FIG. 6), each of which is provided with an elongated slot 96. Screws 98 extend through the slots 96 to engage threaded bores (not shown) of the frame structure's side 86 to firmly position the spring clip 90 against the frame structure 84. It will be appreciated that the configuration of the slots 96 permits the orientation of the spring clip 90 with respect to the internal frame structure 84 to be adjusted to effect an accurate alignment of the clip's aperture 92 with the frame structure's aperture 88.

The clip 90 is specially configured to releasably receive a data card container 100 and to accurately position that member within the camera system 10 to facilitate the photographing of certain information imprinted on the section 35 of the data card 32. In this respect, the spring clip 90 includes a pair of cantilever arms 102 which serve to grip the container 100 against a support surface 104 (See also FIGS. 6 and 7), each of which arms is provided with a detent 106 adapted to releasably seat in recesses 108 of the container's housing 111 at such time as the container is fully inserted into the spring clip. This arrangement facilitates the easy removal of the container 100 from the camera system 10 for purposes of remedying any malfunctions associated therewith such as a jammed data card.

The housing or shroud 12 of the camera system 10 is specially configured and provided with an elongated opening 109 adjacent the spring clip 90 to facilitate the insertion of the container 100 into the spring clip from a position exterior of the camera system 10 and the subsequent selective removal of that member from that clip. Also, the spring clip 90 is provided with edge sections 110 which extend from the opposite sides of the support surface 104 into engagement with the container's housing 111 to restrain lateral movement of the container 100 within the spring clip. Still further, an edge section 112 extends from the clip's support surface 104 to limit the extent to which the container 100 may be inserted into the clip 90. Outwardly depending portions 114 of the arms 102, a similar portion 116 of the support surface 104 and similar portions 118 of the edge sections 110 serve to guide the container 100 into the spring clip 90 as that member is inserted into the camera system 10. The container 100 includes an aperture 117 identical in size and shape to apertures 88 and 92 and positioned to be automatically aligned with the clip's aperture 92 when the container is fully inserted thereinto.

The container 100 may be formed of any suitable material, such as polystyrene, and is provided with a fluted elongated opening 120 adapted to facilitate the introduction of the data card 32 into the container such that its section 35 containing the imprinted information is positioned in a section 121 of the container in alignment with the apertures 117, 92 and 88 of the container 100, the clip 90 and the frame structure 84, respectively. In this connection, a pressure platen 122 is located within the container's section 121 and resiliently biased in the direction of the container's aperture 117 by an offset generally "U-shaped" spring element 124. The end 126 of the pressure platen 122 adjacent the opening 120 is offset in a direction away from the aperture 117 so as to guide the data card 32 intermediate the pressure platen and that aperture as the card is inserted into the container 100.

Intermediate the container's opening 120 and its section 121, wherein the pressure plate 122 is mounted, the container is provided with a light-sealing chamber 128. In this respect, a relatively opaque flexible material 130, such as a felting, is attached by any suitable means to one wall 132, which in part defines the chamber 128, and extends across that chamber into contact with the opposed wall 134 of the chamber. It will thus be appreciated that the opaque flexible material 130 serves to seal the container section 121 in a lighttight manner when no data card is positioned within the camera system 10. Further, this light seal is not broken in the process of inserting the data card 32 into the container 100 since, although the material 130 is deflected by the card during such insertion process, it maintains firm contact with the card. Also, it will be appreciated that the nature of this chamber 128 precludes the breaking of its light sealing characteristic when the data card 32 is subsequently withdrawn from the container 100.

OPERATION OF THE PREFERRED EMBODIMENT

To briefly summarize the operation of the preferred embodiment of this invention, the film pack 22 and the polarizing plate 34 are appropriately mounted in the film holder 18, then that holder is connected to the camera's first section 14, and the leading sheet of photographic material 24 uncovered in accordance with conventional procedures. When the subject arrives to obtain his identification card, the operator or an assistant ascertains the necessary information and types that information onto the section 35 of the data card 32. This data card 32 is then inserted into the container 100 through its elongated opening 120. When the card 32 is fully inserted into the container 100, its section 35 on which the information intended to be photographically reproduced is imprinted, is accurately positioned in alignment with the apertures 117, 92 and 88 and at the proper plane for photographing purposes.

The subject is seated in front of the camera system 10 and, gripping the handle 20, the operator aims the camera system 10 at the subject and depresses the button 52. This depression of the button 52 simultaneously fires the flash unit 44 and triggers the shutter of the element 50, which latter action in turn causes the flash unit 48 to be fired.

Light rays from the data card 32 are polarized by the element 56 and an image of that card is formed on the sheet of photographic material 24 by the objective lens elements 36. Similarly, light rays from the subject are polarized by the element 58 and an image of the subject is formed by the lens of the element 50 on the sheet of photographic material 24. Since the transmission axes of the polarizing element 58 and the section 76 of the sheet 68 are orthogonally aligned with respect to the polarizing element 56 and the section 74 of the sheet 68, light rays intersecting the section 66 of the sheet of photographic material 24 are limited to those from the subject, while the light rays intersecting the section 80 of the sheet of photographic material are limited to those from the data card 32. An image of the indicia 78 on the light transparent support 72 is recorded on the sheet of photographic material 24 so as to appear in part on section 66 thereof and in part on section 80 thereof.

After these operations have been performed, the operator may pull the tab 28 to withdraw the film unit including the sheet of photographic material 24 from the camera 10 and to simultaneously effect the processing of that sheet 24. Then, the data card 32 may be withdrawn from the container 100 and another such card containing information concerning the next subject to be photographed inserted thereinto.

Those familiar with the photographic arts will readily appreciate the novel and highly unique advantages of this invention. An effective and relatively inexpensive camera system is provided for producing an identification card which includes images of a subject and certain printed data on mutually exclusive areas thereof without any image overlap. Most importantly, this system does not require the use of a shutter in conjunction with the objective lens employed to form an image of the printed data on the sheet of photographic material. Data cards may be inserted into and withdrawn from the camera system without disrupting the light sealing nature of its housing. Also, the camera system's data card container may be readily removed when desirable for purposes of remedying any operational defects associated therewith.

This invention may be practiced or embodied in still other ways without departing from the spirit or essential character thereof. The preferred embodiment described herein is therefore illustrative and not restrictive, the scope of the invention being indicated by the appended claims and all variations which come within the meaning of the claims are intended to be embraced therein.

I claim:

1. A camera system for recording images of a subject positioned exteriorly of said system and of information presented on a first portion of a card on mutually exclusive areas of a sheet of photographic material, comprising:
   a housing having an opening provided therein;
   first means for mounting such sheet of photographic material within said housing;
   second means for forming an image of such subject on such sheet of photographic material;
   a support within said housing having an aperture provided therethrough;
   third means for removably receiving such first portion of such card and for mounting such first portion within said housing at a predetermined position for purposes of photographing, said third means including a container insertable into said housing through said housing opening and having an opening to facilitate the introduction of such card thereinto and including a section to receive such first portion of such card when such card is inserted through said container opening and having an aperture located to be positioned in alignment with such first portion of such card when such card is fully inserted into said container and fourth means intermediate said container opening and said section for continually maintaining a light seal between said container opening and said section while permitting such first portion of such card to be introduced through said container opening into said section with a second portion of such card remaining accessible exteriorly of said housing to facilitate the subsequent removal of such card therefrom;
   fifth means for removably connecting said container to said support with said apertures in alignment when said container is inserted into said housing;
   sixth means for selectively illuminating such first portion of such card when such portion is positioned within said housing in alignment with said apertures;
   seventh means for forming an image of such first portion of such card on such sheet of photographic material; and
   eighth means for limiting the light rays intersecting a first selected section of such sheet of photographic material to those from such subject and for limiting the light rays intersecting a second selected section of such sheet of photographic material to those from such first portion of such card.

2. The camera system of claim 1 wherein said third means include a pressure platen within said section of said container adjacent said container aperture, means for resiliently urging said pressure platen toward said container aperture and means for guiding such first portion of such card between said pressure platen and said container aperture as such card is inserted into said container.

3. The camera system of claim 1 wherein said fourth means comprises a chamber and a relatively opaque flexible material attached to one wall thereof and extending thereacross into contact with an opposite wall thereof, whereby such first portion of such card may be inserted through said chamber and subsequently withdrawn therethrough without disrupting the light-sealing nature of said chamber.

4. The camera system of claim 3 wherein said flexible material is a felt material.

5. The camera system of claim 1 wherein said fifth means includes a spring clip connected to said support to removably receive and retain said container.

6. The camera system of claim 5 additionally comprising means for adjusting the orientation of said spring clip with respect to said support.

7. The camera system of claim 5 wherein said spring clip includes means for guiding said container thereinto and for accurately positioning said container therein with respect to said support aperture.

8. A camera system for recording images of a subject positioned exteriorly of said system and of information presented on a first portion of a card on a sheet of photographic material comprising:
   a support having an aperture provided therethrough;
   a container having an elongated opening to facilitate the introduction of such card thereinto and including a section to receive such first portion of such card when such card is inserted through said opening and having an aperture located to be positioned in alignment with such first portion of such card when such card is fully inserted into said container and means intermediate said opening and said section for continually maintaining a light seal between said opening and said section while permitting such first portion of such card to be introduced through said opening into said section with a second portion of such card remaining accessible exteriorly of said container to facilitate the subsequent removal of such card therefrom;
   means connected to said support for removably receiving said container and for positioning said container aperture in alignment with said support aperture;
   a shroud overlying at least the portion of said container in which such first portion of such card is adapted to be mounted having an elongated opening through which said container may be inserted into said container receiving and positioning means with a portion of said container extending exteriorly of said elongated opening of said shroud when said container is fully inserted into said container receiving and positioning means to facilitate selective removal of said container from said container receiving and positioning means.

9. The camera system of claim 8 wherein said container receiving and positioning means includes a spring clip.

10. The camera system of claim 9 wherein one of the members selected from the group consisting of said container and said spring clip includes a detent and the other of said members is provided with a recess, whereby said detent is removably seated in said recess when said container is fully inserted into said container receiving and positioning means.

11. A camera for recording images of a subject positioned exteriorly thereof and of information presented on a first portion of a card on mutually exclusive areas of a sheet of photographic material, comprising:

a housing having an aperture provided therein;

first means for mounting such sheet of photographic material within said housing;

second means for forming an image of such subject on such sheet of photographic material;

a support within said housing;

third means for removably receiving such first portion of such card and for mounting such first portion within said housing at a predetermined position for purposes of photographing, said third means including a container insertable into said housing through said housing opening and having an opening to facilitate the introduction of such card thereinto and including a section to receive such first portion of such card when such card is inserted through said container opening and having an aperture located to be positioned in alignment with such first portion of such card when such card is fully inserted into said container and fourth means intermediate said container opening and said section for continually maintaining a light seal between said container opening and said section while permitting such first portion of such card to be introduced through said container opening into said section with a second portion of such card remaining accessible exteriorly of said housing to facilitate the subsequent removal of such card therefrom;

fifth means for removably connecting said container to said support when said container is inserted into said housing;

sixth means for selectively illuminating such first portion of such card when such portion is positioned within said container in alignment with said container aperture;

seventh means for forming an image of such first portion of such card on such sheet of photographic material; and eighth means for limiting the light rays intersecting a first selected section of such sheet of photographic material to those from such subject and for limiting the light rays intersecting a second selected section of such sheet of photographic material to those from such first portion of such card.

12. The camera of claim 11 wherein said container additionally includes a pressure platen within said section thereof adjacent said container aperture, means for resiliently urging said pressure platen towards said container aperture and means for guiding such first portion of such card between said pressure platen and said container aperture as such card is inserted into said container.

* * * * *